D. J. W. MURDOCK.
PIPE COUPLING.
APPLICATION FILED JUNE 19, 1912.

1,048,855.

Patented Dec. 31, 1912.

Witnesses
Joseph C. Stack
E. L. Williams

Inventor
D. J. W. Murdock
By Chas. E. Riordan
Attorney

UNITED STATES PATENT OFFICE.

DARIUS J. W. MURDOCK, OF WATERVILLE, WASHINGTON.

PIPE-COUPLING.

1,048,855.   Specification of Letters Patent.   Patented Dec. 31, 1912.

Application filed June 19, 1912. Serial No. 704,553.

*To all whom it may concern:*

Be it known that I, DARIUS J. W. MURDOCK, a citizen of the United States, residing at Waterville, in the county of Douglas and State of Washington, have invented certain new and useful Improvements in Pipe-Couplings, of which the following is a full, clear, and exact specification.

This invention relates to pipe couplings and has for its object the provision of a simple and inexpensive construction whereby the meeting ends of adjoining pipe sections may be firmly secured together and will be permitted to expand, or contract when subjected to a high temperature or other influence, without admitting air or water through the joint to the pipe.

The invention also seeks to facilitate the assembling of the pipe sections and other incidental objects will appear as the description of the invention proceeds.

The invention is illustrated in the accompanying drawings, in which—

Figure 1:
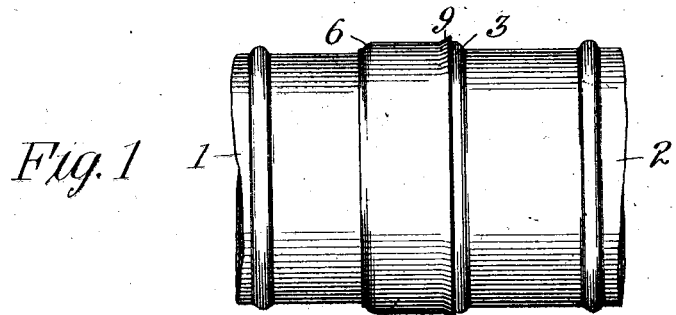
Figure 2:
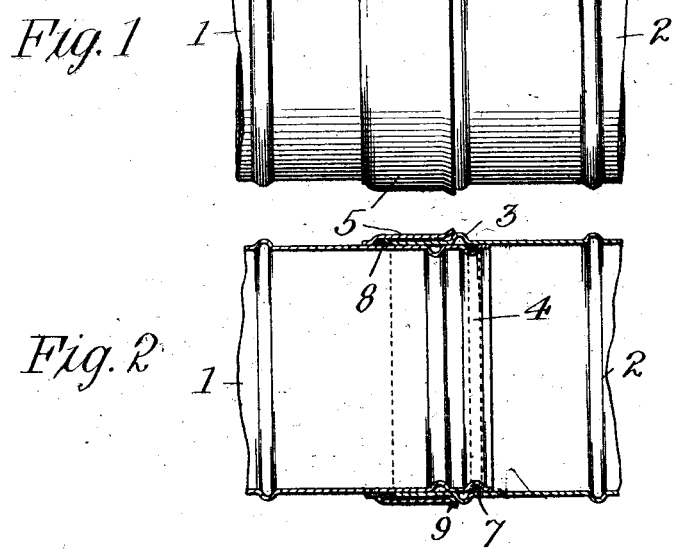
Figure 3:
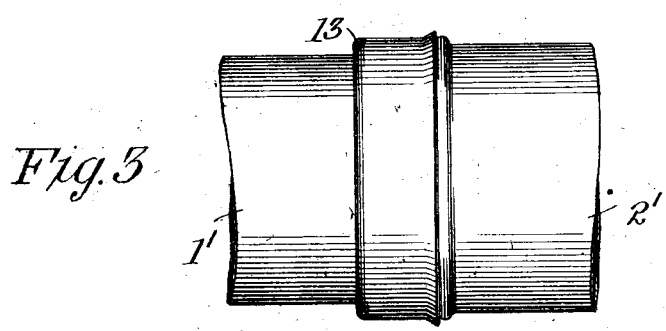
Figure 4:
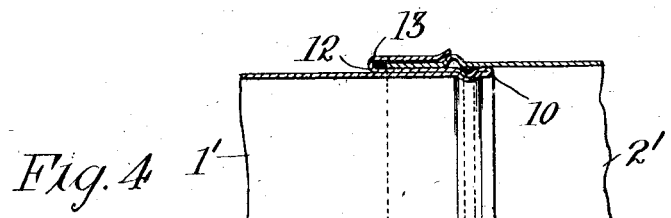

Figure 1 is an elevation of one form of the coupling; Fig. 2 is a longitudinal section of the same; Fig. 3 is an elevation of another form of the coupling; Fig. 4 is a longitudinal section of the same.

Referring to the drawings, the meeting ends of the pipe sections are designated 1 and 2, the section 1 being hereinafter termed the female section and the section 2 being termed the male section. The male section is provided with one or more annular external beads 3 but is otherwise cylindrical. The female section is constructed adjacent its end with internal annular beads 4, external grooves being thereby formed in the female section and internal grooves being formed in the male section. Upon the female section, near, (but somewhat removed from) the end of the same, is a collar or ring 5 which is rigid with the pipe section but is offset therefrom, as shown at 6, whereby a space is provided between the collar and the pipe section 1 to receive the end of the male section 2. A packing of any suitable material indicated at 7 is placed in one or more of the external grooves in the female section and the end of the male section is then slipped over the same and into the collar, molten lead or similar expansible material, 8, being then placed in the collar so as to fill the space therein not occupied by male section. The free edge of the collar is flared as shown at 9, so as to be readily engaged by the bead 3 on the male section and thereby limit the coupling movement. This construction also facilitates assembling, as if the sections should be slightly out of alinement, the flared formation of the collar will guide them into alinement. As the male section passes into the assembled position, it will compress the packing 7 so that leakage between the sections will be prevented and the packing 8 will effectually prevent leakage between the collar and the male section. The beads formed in the sections serve to reinforce them and at the same time permit them to expand and contract without becoming separated. The packing 8 will preferably be of lead or some other material which is impervious to air and moisture and responds readily to variations in temperature so that the space around the end of the outer section will be completely sealed under all conditions.

The collar may be made integral with the pipe section as by being cast therewith or it may be made separate and brazed or otherwise rigidly secured thereon. In Figs. 1 and 2 I have shown the collar as a separate pipe. In Figs. 3 and 4 I have shown a construction which may be advantageously employed in sheet metal pipes. In this form the female member 1' has its end doubled on itself, as at 10, and interfitting beads 11 are formed in the plies thus formed. The outer ply 12, is then folded outwardly as at 13, and extended toward the extremity of the section to form the collar which receives the end of the male section 2'. These folds will be most conveniently made before the sheet is rolled to form the pipe. The construction is inexpensive and permits the finished article to be produced very expeditiously.

Having thus fully described my invention what I claim as new and desire to secure by Letters Patent is:—

1. A pipe coupling comprising overlapping pipe sections, the inner section having its end doubled on itself to form superposed plies and then folded outward to form a collar spaced from and surrounding the outer ply and the outer pipe section, said superposed plies having interfitting external grooves, packing arranged in the groove of the outer ply and compressed by the outer section, and packing in the collar sealing the outer pipe section.

2. A pipe coupling comprising overlapping pipe sections, a collar on said inner section surrounding the outer section, packing in said collar sealing the outer pipe section, the inner pipe section having an external annular groove arranged beyond the outer edge of said collar, and packing in said groove compressed by the outer pipe section.

In testimony whereof I have signed my name to this specification in the presence of two subscribing witnesses.

DARIUS J. W. MURDOCK.

Witnesses:
  ARTHUR McGUIRE,
  M. J. SHEERAN.